(12) United States Patent
Hachisuka

(10) Patent No.: US 7,056,859 B2
(45) Date of Patent: Jun. 6, 2006

(54) CATALYST FOR PURIFYING EXHAUST GASES

(75) Inventor: Ichiro Hachisuka, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 82 days.

(21) Appl. No.: 10/389,919

(22) Filed: Mar. 18, 2003

(65) Prior Publication Data

US 2004/0038812 A1 Feb. 26, 2004

(30) Foreign Application Priority Data

Mar. 19, 2002 (JP) .............................. 2002-076598
Feb. 4, 2003 (JP) .............................. 2003-027034

(51) Int. Cl.
 *B01J 23/00* (2006.01)
(52) U.S. Cl. ................ 502/527.13; 502/313; 502/327; 502/330; 502/332; 502/333; 502/334; 502/339; 502/351; 502/355; 502/415; 502/439
(58) Field of Classification Search ................ 502/213, 502/242, 254, 263, 261, 262, 313, 327, 330, 502/332–334, 339, 351, 355, 415, 439, 527.12, 502/527.13
See application file for complete search history.

(56) References Cited

U.S. PATENT DOCUMENTS

| | | | | |
|---|---|---|---|---|
| 5,811,064 A | * | 9/1998 | Kojima et al. ............... 422/180 |
| 6,071,850 A | * | 6/2000 | Friedman et al. ........... 502/439 |
| 6,426,316 B1 | * | 7/2002 | Tanaka et al. ............... 502/340 |
| 6,444,610 B1 | * | 9/2002 | Yamamoto ................... 502/325 |
| 6,514,905 B1 | * | 2/2003 | Hanaki et al. ............... 502/328 |
| 6,649,563 B1 | * | 11/2003 | Nakanishi et al. ........... 502/439 |
| 6,677,264 B1 | * | 1/2004 | Klein et al. ................... 502/74 |
| 2001/0056034 A1 | | 12/2001 | Noda et al. | |

FOREIGN PATENT DOCUMENTS

| | | |
|---|---|---|
| EP | 1 078 678 | 2/2001 |
| EP | 1 112 774 | 7/2001 |
| EP | 1 166 853 | 1/2002 |
| JP | 5-168860 | 7/1993 |
| JP | 5-317652 | 12/1993 |
| JP | 6-31139 | 2/1994 |
| JP | 2000-279810 | 10/2000 |

* cited by examiner

*Primary Examiner*—Cam N. Nguyen
(74) *Attorney, Agent, or Firm*—Finnegan, Henderson, Farabow, Garrett & Dunner, LLP

(57) ABSTRACT

A catalyst for purifying exhaust gases which can suppress an active ingredient, such as an alkali metal, which reacts with a substrate from moving to the substrate, thereby preventing a decrease in strength such as thermal shock resistance of the substrate. In production, first, a first oxide layer composed mainly of an oxide which has a high reactability with the active ingredient is formed on the substrate. Next, a second oxide layer composed mainly of an oxide which has a low reactability with the active ingredient is formed on the first oxide layer. Then, a catalyst layer loaded at least with a noble metal and the active ingredient is formed on the second oxide layer. This second oxide layer suppresses transfer of the active ingredient and some active ingredient which has passed through the second oxide layer is caught by the first oxide layer owing to its reaction.

8 Claims, 1 Drawing Sheet

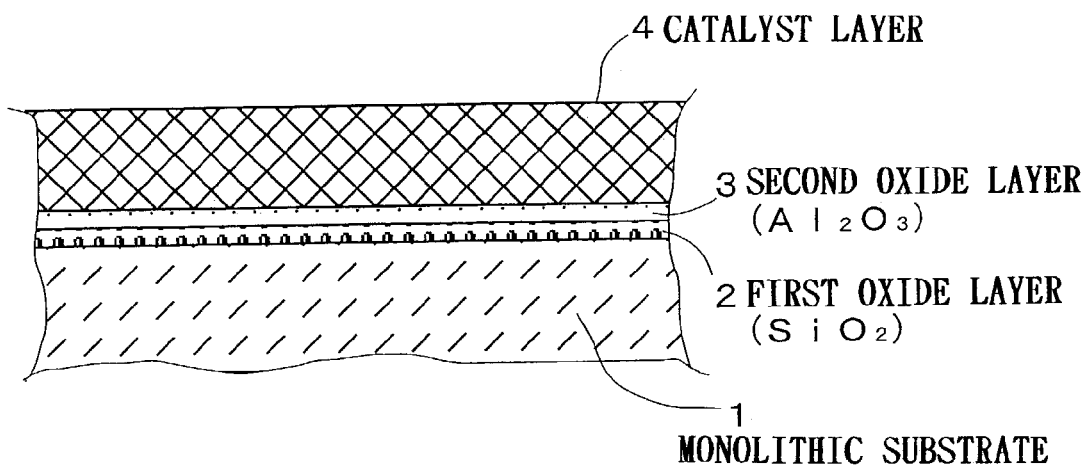
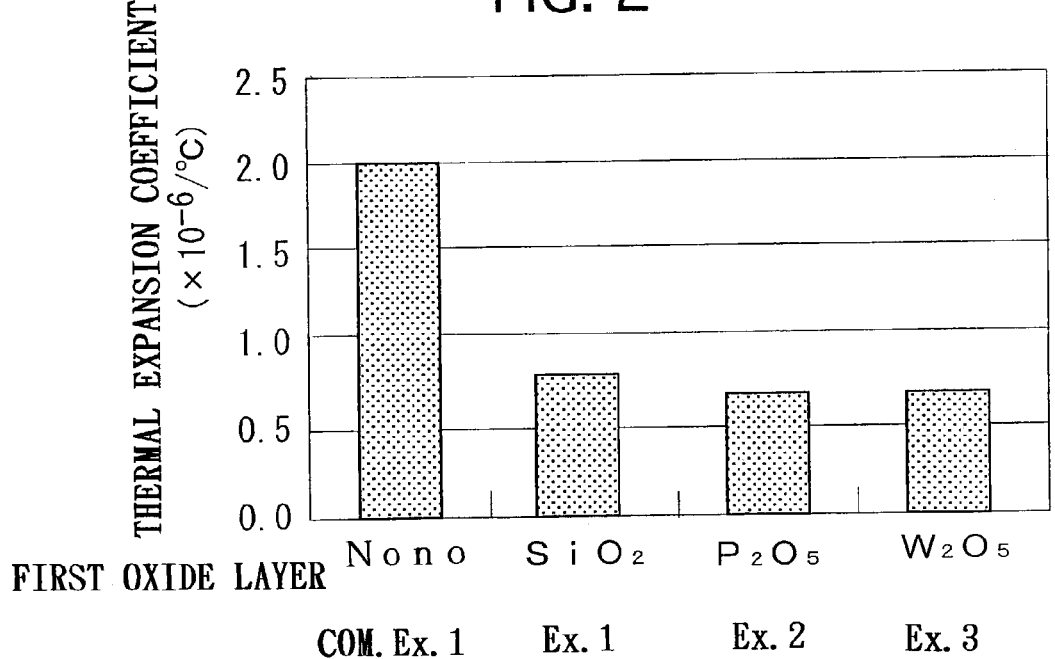

CATALYST FOR PURIFYING EXHAUST GASES

BACKGROUND OF THE INVENTION

1. Field of the Invention

This invention relates to a catalyst for purifying exhaust gases which is used in the exhaust system of automotive engines, and more particularly to a catalyst for purifying exhaust gases which is excellent in strength such as thermal shock resistance.

2. Description of the Related Art

Recently, global warming due to carbon dioxide has become an issue and reduction of carbon dioxide emissions has become a demanding task. In the field of automobiles, a decrease in the carbon dioxide content in exhaust gases has also been demanded, and lean-burn engines which burn lean fuel under oxygen-excessive atmospheres have been developed. Owing to their superior fuel economy, these lean-burn engines can suppress carbon dioxide emissions.

A system for these lean burn engines has been developed and reduced into practical use in which an air/fuel mixture is generally burned under fuel-lean conditions i.e., in oxygen-excessive atmospheres but intermittently burned under stoichiometric to fuel-rich conditions in order to make the exhaust gases reducing atmospheres and reduce $NO_x$ into innocuous entities. As a most suitable catalyst for this system, a $NO_x$ storage-and-reduction catalyst using a $NO_x$ storage component has been developed, which sorbs $NO_x$ in fuel-lean atmospheres and releases the sorbed $NO_x$ in stoichiometric to fuel-rich atmospheres.

For example, Japanese Unexamined Patent Publication (KOKAI) No. 5-317,652 proposed a catalyst for purifying exhaust gases in which Ba or other alkaline earth metals and Pt are loaded on a porous oxide such as $\gamma\text{-}Al_2O_3$. Japanese Unexamined Patent Publication (KOKAI) No. 6-031,139 proposed a catalyst for purifying exhaust gases in which K or other alkali metals and Pt are loaded on a porous oxide such as $\gamma\text{-}Al_2O_3$. Japanese Unexamined Patent Publication (KOKAI) No.5-168,860 proposed a catalyst for purifying exhaust gases in which La or other rare-earth elements and Pt are loaded on a porous oxide such as $\gamma\text{-}Al_2O_3$.

In using these $NO_x$ storage-and-reduction catalysts, exhaust gases are pulsatingly changed from fuel-lean atmospheres to stoichiometric to fuel-rich atmospheres by controlling the air/fuel ratio pulsatingly from a fuel-lean side to a stoichiometric to fuel-rich side. Hence, $NO_x$ are sorbed by a $NO_x$ storage component on the fuel-lean side and the sorbed $NO_x$ are released on the stoichiometric to fuel-rich side and reacted with and purified by reducing components such as hydrocarbons (HC) and carbon monoxide (CO) contained in large amounts in the exhaust gases. Thus, $NO_x$ in exhaust gases even from lean-burn engines can be purified at a high efficiency. HC and CO in exhaust gases can also be efficiently purified, since the HC and CO are not only oxidized by a noble metal and but also used for reducing $NO_x$.

By the way, a catalyst for purifying exhaust gases from an automotive engine must be stably held in an exhaust gas passage of an automobile in order to increase the area of contact between exhaust gases and a catalyst ingredient while an increase in pressure loss must be suppressed as much as possible. To meet these demands, a honeycomb-shaped support substrate formed of a $MgO\text{--}Al_2O_3\text{--}SiO_2$ composite oxide such as cordierite has been conventionally used and a monolithic catalyst has often been used which comprises this support substrate and a catalyst layer formed on the surface of the support substrate by loading a catalytic ingredient on a porous oxide.

However, it has been turned out that a $NO_x$ storage-and-reduction monolithic catalyst, using an alkali metal as a $NO_x$ storage component, suffers from degradation of a support substrate during its use, and deteriorates in strength such as thermal shock resistance when compared with other catalysts such as three-way catalysts. For example, in the case of a $NO_x$ storage-and-reduction catalyst for purifying exhaust gases employing, as a substrate, a structural member such as cordierite composed of a $MgO\text{--}Al_2O_3\text{--}SiO_2$ composite oxide and having a catalyst layer formed by loading a noble metal and an alkali metal on a porous oxide such as alumina, the thermal expansion coefficient is larger than that of a catalyst which does not include any alkali metal. As the thermal expansion coefficient is larger, the thermal shock resistance is lower and the strength is also lower.

Investigation on distribution of the alkali metal loaded in a catalyst which got a large thermal expansion coefficient has showed the existence of the alkali metal even in the substrate. Consequently, it has been clarified that the cause of strength deterioration lies in the fact that the alkali metal reacts with a component ($SiO_2$ in particular) of the substrate in the boundary of the catalyst layer and the substrate, which changes the composite oxide composition of the substrate.

In this connection, Japanese Unexamined Patent Publication (KOKAI) No.2000-279810 has proposed a catalyst for purifying exhaust gases which has a zirconia layer between a catalyst layer loaded with a noble metal and a $NO_x$ storage component, and a substrate. Since zirconia hardly reacts with alkali metals, the zirconia layer inhibits an alkali metal from moving into the substrate. A decrease in strength of the substrate can be thus suppressed.

However, the catalyst for purifying exhaust gases disclosed in Japanese Unexamined Patent Publication (KOKAI) No.2000-279,810 still suffers from a problem in that the zirconia layer inevitably has pores between zirconia particles, and the alkali metal passes through these pores and reaches and reacts with the substrate, which results in a decrease in strength of the substrate.

SUMMARY OF THE INVENTION

The present invention has been developed under these circumstances. It is an object of the present invention to suppress transfer of an active ingredient which reacts with a support substrate, thereby preventing such a problem as a decrease in strength of the support substrate.

A catalyst for purifying exhaust gases, which dissolves the above problem, comprises a support substrate, and a catalyst layer formed by loading, on a porous oxide, an active ingredient having reactability at least with the support substrate, and a noble metal, wherein the catalyst further comprises a first oxide layer formed on a surface of the support substrate and composed mainly of an oxide which has a high reactability with the active ingredient, and a second oxide layer formed on a surface of the first oxide layer and composed mainly of an oxide which has a low reactability with the active ingredient, and the catalyst layer is formed on a surface of the second oxide layer.

Since alkali metal is a typical active ingredient, it is desirable that the oxide which has a high reactability with the active ingredient is an oxide of at least one metal selected from Si, P, W and Ti. It is also desirable that the oxide which has a low reactability with the active ingredient is an oxide of at least one metal selected from Al, Zr, Ce and Y.

It is further desirable that neither the first oxide layer nor the second oxide layer includes a noble metal.

In the catalyst for purifying exhaust gases according to the present invention, a catalyst layer includes an active ingredient, such as an alkali metal, which has reactability at least with a support substrate, and a first oxide layer and a second oxide layer are formed between the support substrate and the catalyst layer in the order from the support substrate. In transfer, the active ingredient in the catalyst layer passes through the second oxide layer first. The second oxide layer, however, is mainly composed of an oxide which has a low reactability with the active ingredient, so transfer of the active ingredient to the first oxide layer is inhibited. Most of the active ingredient can be remained in the catalyst layer and exhibit a high conversion efficiency.

Some active ingredient which has passed through pores of the second oxide layer reaches the first oxide layer. Since the first oxide layer is mainly composed of an oxide which has a high reactability with the active ingredient, most of the active ingredient which has reached the first oxide layer is caught there owing to its reaction with that oxide, and transfer of the active ingredient to the support substrate is inhibited. Even if there are pores between particles of the first oxide layer, the absolute amount of the active ingredient which reaches the first oxide layer is small because the second oxide layer inhibits transfer of most of the active ingredient, and therefore the amount of the active ingredient which passes through the pores of the first oxide layer and reaches the support substrate is even smaller. So, the amount of the active ingredient which reacts with the support substrate is extremely small, and a decrease in strength of the support substrate can be suppressed by far.

It is to be noted that even in the case of the conventional catalyst for purifying exhaust gases having a catalyst layer alone, all of the active ingredient, such as an alkali metal, loaded in the catalyst layer does not move to the support substrate, and that only several percent of the active ingredient loaded moves to the support substrate. However, for instance, when the active ingredient is an alkali metal, the absolute amount of $SiO_2$ in the support substrate is overwhelmingly large with respect to the absolute amount of the alkali metal which moves, so almost all of the alkali metal which has moved reacts with the support substrate, thereby decreasing strength of the support substrate.

On the other hand, in the case of the catalyst for purifying exhaust gases according to the present invention, even if several percent of the active ingredient loaded is to move to the support substrate, the transfer is inhibited by the second oxide layer, so the amount of the active ingredient which has passed through the second oxide layer is small. Furthermore, since most of all the active ingredient which has passed through the second oxide layer and has reached the first oxide layer reacts with the oxide of the first oxide layer, the amount of the active ingredient which reaches the support substrate is even smaller. Thus, a decrease in strength of the support substrate can be securely suppressed.

Hence, in the case of the catalyst for purifying exhaust gases according to the present invention, a decrease in strength of the support substrate can be securely suppressed. At the same time, since transfer of the active ingredient is inhibited by the second oxide layer, the amount of the active ingredient remaining in the catalyst layer is larger than that of the conventional catalyst. So, the catalyst of the present invention can exhibit such a high $NO_x$ storage ability as that of the catalyst disclosed in Japanese Unexamined Patent Publication (KOKAI) No.2000-279,810 and exhibit a high $NO_x$ conversion efficiency.

Examples of the support substrate include MgO—$Al_2O_3$—$SiO_2$ composite oxides such as cordierite, $TiO_2$—$Al_2O_3$ composite oxides and $Si_3N_4$ It is desirable to employ MgO—$Al_2O_3$—$SiO_2$ composite oxides, which are particularly excellent in terms of heat resistance. The shape of this support substrate is not limited in particular as long as it has a large area of contact with exhaust gases and can be exemplified by honeycomb shape, foamy shape, net shape and pellet shape. It is also possible to employ, as a support substrate, a honeycomb-shaped metal foil substrate coated with powder of an MgO—$Al_2O_3$—$SiO_2$ composite oxide or other above-mentioned oxides.

The catalyst layer is formed by loading, on a porous oxide, an active ingredient having reactability at least with the support substrate, and a noble metal. The porous oxide can be variously selected from $Al_2O_3$, $ZrO_2$, $TiO_2$, $CeO_2$ and the like. It is possible to use only one kind of these oxides or plural kinds of these oxides. It is also possible to use a composite of plural kinds of these oxides. For example, it is preferable to include at least $Al_2O_3$ in view of catalytic activity and if $TiO_2$ is mixed, resistance against sulfur poisoning is improved. If $CeO_2$ or $CeO_2$—$ZrO_2$ solid solution is mixed, conversion efficiency is improved owing to its oxygen storage ability.

The noble metal can be one or more elements selected from Pt, Rh, Pd, Ir, Ru and the like. The amount of the noble metal loaded is preferably in the range from about 0.1 to 20% by weight per liter of the catalyst.

The active ingredient has reactability at least with the support substrate and is different in accordance with the material of the support substrate. When the support substrate contains $SiO_2$, an alkali metal is employed as a typical active ingredient. In this case, the alkali metal serves as a $NO_x$ storage component in the catalyst layer and the catalyst for purifying exhaust gases according to the present invention functions as a $NO_x$ storage-and-reduction catalyst.

In the case of the $NO_x$ storage-and-reduction catalyst, the alkali metal is exemplified by K, Na, Cs and Li, and the amount of the alkali metal loaded is preferably in the range from 0.01 to 1.0 mol per liter of the catalyst. When this amount is smaller than the range, the $NO_x$ storage ability deteriorates. On the other hand, when this amount is larger than the range, the absolute amount of the alkali metal which passes through the second oxide layer and reaches the first oxide layer gets larger and the amount of the alkali metal which passes through the first oxide layer and reaches the support substrate also gets larger. This might lead to insufficient strength of the support substrate.

In the case of the $NO_x$ storage-and-reduction catalyst, it is also preferable to employ at least one of alkaline earth metals and rare earth elements in addition to an alkali metal. The alkaline earth metals can be exemplified by Ba, Be, Ca Mg and Sr. The rare earth elements can be exemplified by Sc, Y, La, Yb, Nd and Sm. Since alkaline earth metals or rare earth elements do not react with such a support substrate as cordierite, the amount of the alkaline earth metals or rare earth elements loaded can be as much as that of the conventional catalyst, i.e., 0.1 to 2 mol per liter of the catalyst.

The first oxide layer is mainly composed of an oxide which has a high reactability with the active ingredient. Desirably the oxide is easy to react or reacts with the active ingredient and exhibits excellent adhesion properties to the support substrate and the second oxide layer. The phrase "an oxide which has a high reactability with the active ingredient" is used in a relative meaning and means an oxide which has a higher reactability with the active ingredient than an oxide used in the second oxide layer. For example, when K is loaded as an active ingredient in the catalyst layer, it is desirable to employ an oxide which reacts with K at a reaction coefficient of 80% or more after the catalyst with K loaded is held at 800° C. for 10 hours.

When the active ingredient is an alkali metal, preferred examples of the oxide which has a high reactability with the active ingredient include silica, phosphorus oxide, tungsten oxide, and titania. The first oxide layer can be constituted by these oxides alone or by mixing these oxides with other oxides. The content of the other oxides is desirably 40% by weight or less. When the content of the other oxides exceeds this range, there is a fear that the absolute amount of the alkali metal caught by its reaction is insufficient and transfer of the alkali metal is hardly inhibited.

This first oxide layer desirably has a thickness of 40 μm or less. The first oxide layer of more than 40 μm in thickness is not preferable because properties of the first oxide layer affect properties of the entire catalyst, which results in a decrease in purifying performance and an increase in pressure loss. On the other hand, the first oxide layer preferably has a thickness of at least 5 μm. When the thickness of the first oxide layer is smaller than 5 μm, there is a fear that the absolute amount of the active ingredient caught by its reaction is insufficient and transfer of the active ingredient to the support substrate is hardly inhibited.

Formation of the first oxide layer on a surface of the support substrate is carried out, for example, by washcoating the support substrate with powder of an oxide which has a high reactability with the active ingredient and then calcining the coated support substrate. In this case, a first oxide layer with a desired thickness can be formed by controlling the particle diameter and the amount of the oxide powder coated. Desirably, the oxide powder has a particle diameter of 5 μm or less, because when the particle diameter exceeds 5 μm, a dense first oxide layer is hardly formed and the active ingredient easily moves to the support substrate through pores of the first oxide layer.

Calcination temperature is desirably in the range from 600 to 1500° C. With calcination below 600° C., a dense first oxide layer is hardly obtained and the active ingredient is easy to pass through pores. When cordierite is used as a support substrate, the upper limit of the calcination temperature is preferably set at 1500° C. because cordierite is resistant to 1500° C. at the maximum.

Formation of the first oxide layer on a surface of the support substrate is also carried out by forming metal hydroxide precipitate on the surface of the support substrate by acid-alkali reaction and calcining it. For example, the support substrate is immersed in an aqueous tungsten nitrate solution and ammonia is added to the solution, whereby tungsten hydroxide is deposited on the surface of the support substrate. By calcining the support substrate having the deposits, a first oxide layer composed of tungsten oxide can be formed on the surface of the support substrate.

Although there are innumerable microscopic irregularities on a surface of a support substrate such as cordierite, the above process of coating a support substrate with the oxide powder and calcining the coated support substrate is hard to form a first oxide layer on the inside of fine concavities, and the first oxide layer may cover fine concavities and form pores with the surface of the support substrate. In this case, there is a fear that the active ingredient moves to the support substrate through these pores.

Accordingly, it is particularly desirable to form a first oxide layer by the above acid-alkali reaction. Since precipitate from the acid-alkali reaction, which is a reaction on a molecular level, is extremely fine, the precipitate even enters into fine concavities on the surface of the support substrate and forms a first oxide layer. Therefore, pores are prevented from being formed between the first oxide layer and the surface of the support substrate and transfer of the active ingredient to the support substrate can be further inhibited.

Formation of the first oxide layer can also be carried out by the physical vapor deposition process or the chemical vapor deposition process.

The second oxide layer is mainly composed of an oxide which has a low reactability with the active ingredient. Desirably the oxide is hard to react or does not react with the active ingredient and exhibits excellent adhesion properties to the first oxide layer and the catalyst layer. The phrase "an oxide which has a low reactability with the active ingredient" is used in a relative meaning and means that an oxide has a lower reactability with the active ingredient than the oxide used for the first oxide layer. For example, when K is loaded as an active ingredient in the catalyst layer, it is desirably to employ an oxide which reacts with K at a reaction coefficient of 30% or less after the catalyst with K loaded is held at 800° C. for 10 hours.

When the active ingredient is an alkali metal, preferred examples of the oxide which has a low reactability with the active ingredient include an oxide such as α-alumina, θ-alumina, γ-alumina, zirconia, yttria, ceria, and spinel, a composite oxide of a plurality of these oxides, and ceramics such as silicon carbide and silicon nitride. It is particularly desirable to employ an oxide of at least one metal selected from Al, Zr, Ce and Y The second oxide layer can be constituted by these oxides alone, or by mixing these oxides with other oxides. The content of the other oxides mixed is desirably 40% by weight or less. When the content of the other oxides exceeds this range, there is a possibility that transfer of the active ingredient to the first oxide layer is hardly inhibited.

The second oxide layer desirably has a thickness of 40 μm or less. The second oxide layer of more than 40 μm in thickness is not preferable because properties of the second oxide layer affect properties of the entire catalyst, which results in a decrease in purifying performance and an increase in pressure loss. On the other hand, the second oxide layer preferably has a thickness of at least 5 μm. When the thickness of the second oxide layer is smaller than 5 μm, the second oxide layer hardly inhibits transfer of the active ingredient to the first oxide layer and the amount of the active ingredient which reaches the support substrate is larger.

Formation of the second oxide layer on a surface of the first oxide layer is carried out, for example, by washcoating the first oxide layer with powder of an oxide which has a low reactability with the active ingredient and then calcining the coated first oxide layer. In this case, a second oxide layer with a desired thickness can be formed by controlling the particle diameter and the amount of the oxide powder coated. The oxide powder preferably has a particle diameter of 5 μm or less because, when the particle diameter of the oxide powder exceeds 5 μm, a dense second oxide layer is hardly obtained and the active ingredient easily passes through pores of the second oxide layer.

The calcination temperature is desirably in the range from 600 to 1500° C. With calcination below 600° C., a dense second oxide layer is hardly obtained and the active ingredient is easy to pass through pores. When cordierite is employed as a support substrate, the upper limit of calcination temperature is preferably set at 1500° C. because cordierite is resistant to 1500° C. at the maximum.

Formation of the second oxide layer on the surface of the first oxide layer can also be carried out by the same acid-alkali reaction as in the formation of the first oxide layer, and can also be carried out by the PVD process or CVD process.

Though a noble metal can be loaded on at least one of the first oxide layer and the second oxide layer, the rate of exhaust gases reaching the first oxide layer or the second oxide layer is very low and the noble metal loaded hardly contributes to purification. Therefore, it is desirable from the viewpoint of costs that neither the first oxide layer nor the second oxide layer contains a noble metal.

Formation of the catalyst layer on the second oxide layer can be carried out in the same way as formation of a catalyst layer on the conventional support substrate, for example, by washcoating the support substrate having the first oxide layer and the second oxide layer thereon with porous oxide powder, calcining the coated support substrate, and loading at least a noble metal and an active ingredient thereon by an adsorption loading method, an impregnation loading method or the like.

Each of the first oxide layer and the second oxide layer desirably has a thickness of 50 μm or less. When the total thickness of the first oxide layer, the second oxide layer and the catalyst layer exceeds 150 μm, the opening area of honeycomb cells gets small and pressure loss gets large, which might damage engine power. The catalyst layer needs to have a thickness of 50 to 100 μm when the amounts and densities of the noble metal and the active ingredient loaded are about the same as those of the conventional catalyst. Therefore, the total thickness of the first oxide layer and the second oxide layer is preferably 100 μm or less.

It is to be noted that the catalyst for purifying exhaust gases according to the present invention only requires to include an active ingredient in the catalyst layer and is used as a $NO_x$ storage-and-reduction catalyst, a $NO_x$ adsorption catalyst, a three-way catalyst, an oxidation catalyst and so on.

The catalyst for purifying exhaust gases according to the present invention has an advantage in that the catalyst can securely suppress a decrease in support substrate strength caused by reaction with the active ingredient, and accordingly attains improved durability.

BRIEF DESCRIPTION OF THE DRAWINGS

FIG. 1 is a cross-sectional diagram showing the structure of a catalyst according to a preferred embodiment of the present invention.

FIG. 2 is a graph showing thermal expansion coefficients of catalysts according to preferred embodiments and a comparative example after a durability test.

DETAILED DESCRIPTION OF THE PREFERRED EMBODIMENTS

Now, the present invention will be described concretely with reference to preferred embodiments and a comparative example.

(First Preferred Embodiment)

FIG. 1 shows a catalyst for purifying exhaust gases according to the present invention. This catalyst for purifying exhaust gases comprises a honeycomb-shaped monolithic substrate 1 composed of cordierite ($2MgO-2Al_2O_3-5SiO_2$), a first oxide layer 2 of about 20 μm in thickness formed on a surface of the monolithic substrate 1 and composed of $SiO_2$, a second oxide layer 3 of about 30 μm in thickness formed on a surface of the first oxide layer 2 and composed of $Al_2O_3$, and a catalyst layer 4 of about 100 μm in thickness formed on a surface of the second oxide layer 3 and formed by loading Pt and K on $Al_2O_3$. Hereinafter a process of producing this catalyst for purifying exhaust gases will be described instead of giving a detailed description of the present invention.

First, a honeycomb-shaped monolithic substrate 1 composed of cordierite ($2MgO-2Al_2O_3-5SiO_2$) was prepared and washcoated with slurry of $SiO_2$ powder. After dried at 250° C., the coated monolithic substrate 1 was calcined in the air at 300° C. for two hours, thereby forming a first oxide layer 2. The first oxide layer 2 was formed in an amount of 20 g per liter of the monolithic substrate 1, and had an average thickness of 20 μm.

Second, the monolithic substrate 1 having the first oxide layer 2 was washcoated with slurry of γ-$Al_2O_3$ powder, dried at 250° C., and then calcined in the air at 300° C. for two hours, thereby forming a second oxide layer 3. The second oxide layer 3 was formed in an amount of 20 g per liter of the monolithic substrate 1 and had an average thickness of 30 μm.

Next, the monolithic substrate 1 having the second oxide layer 3 was washcoated with slurry of γ-$Al_2O_3$ powder, dried at 250° C., and then calcined in the air at 300° C. for two hours, thereby forming a coating layer. The coating layer was formed in an amount of 270 g per liter of the monolithic substrate 1, and had an average thickness of 100 μm. A dinitrodiammine platinum nitrate solution of a certain concentration was prepared and the monolithic substrate 1 having the coating layer was immersed in and taken out of this solution, and then calcined at 500° C. for two hours, thereby loading Pt. The amount of Pt loaded was 0.1 g per liter of the monolithic substrate 1. Next, the monolithic substrate 1 with Pt loaded was impregnated with a certain amount of an aqueous potassium nitrate solution of a certain concentration, dried at 250° C. for twenty minutes and calcined at 500° C. for thirty minutes, thereby loading K. The amount of K loaded was 0.3 mol per liter of the monolithic substrate 1. A catalyst layer 4 was thus formed.

(Second Preferred Embodiment)

By using $P_2O_5$ powder instead of $SiO_2$ powder, a first oxide layer 2 was formed in an amount of 20 g per liter of the monolithic substrate 1 and in an average thickness of 20 μm. Then a second oxide layer 3 and a catalyst layer 4 were formed in the same way as in the first preferred embodiment.

(Third Preferred Embodiment)

A first oxide layer 2 was formed in an amount of 20 g per liter of the monolithic substrate 1 and in an average thickness of 20 μm by the same way as in the first preferred embodiment, except for using $W_2O_5$ powder instead of $SiO_2$ powder. Then a second oxide layer 3 and a catalyst layer 4 were formed in the same way as in the first preferred embodiment.

FIRST COMPARATIVE EXAMPLE

This example was formed in the same way as the first preferred embodiment, except that a first oxide layer 2 was not formed. A second oxide layer 3 was formed in an amount of 20 g per liter of the monolithic substrate 1 and had the same average thickness as the total thickness of the first oxide layer 2 and the second oxide layer 3 of the first preferred embodiment.

<Experiment and Evaluation>

Each of the above catalysts was placed in an engine bench and subjected to an endurance test by introducing exhaust gases in stoichiometric atmospheres from a gasoline engine of 2.0 liter displacement at a space velocity of 80000 h$^{-1}$ at a catalyst bed temperature of 750° C. for 50 hours. Then the thermal expansion coefficient of the monolithic substrate 1 of each catalyst was measured. The results are shown in FIG. 2.

It is appreciated from FIG. 2 that the catalyst of the first comparative example had a higher thermal expansion coefficient, i.e., a lower thermal shock resistance and a lower strength than the catalysts of the preferred embodiments. The catalysts of the preferred embodiments had smaller thermal expansion coefficients and were superb in terms of thermal shock resistance and strength even after the durability test. This advantage is clearly due to the existence of the first oxide layer 2. It is to be noted that the thermal expansion coefficients of the catalysts of the preferred embodiments remained about the same as that of the monolithic substrate 1 alone even after the endurance test. This verified that almost no reaction occurred between components of the monolithic support substrate and K.

Having now fully described the present invention, it will be apparent to one of ordinary skill in the art that many changes and modifications can be made thereto without departing from the spirit or scope of the present invention as set forth herein including the appended claims.

What is claimed is:

1. A catalyst for purifying exhaust gases, comprising:
   a support substrate;
   a first oxide layer formed on a surface of said support substrate, the first oxide layer comprising a first oxide which has a first reactability with an active ingredient having reactability at least with the support substrate;
   a second oxide layer formed on a surface of said first oxide layer, the second oxide layer comprising a second oxide which has a second reactability with said active ingredient said second reactability being lower than said first reactability; and
   a catalyst layer formed on a surface of said second oxide layer, the catalyst layer comprising a porous oxide, the porous oxide including the active ingredient, and a noble metal loaded on the porous oxide,
   wherein transfer of the active ingredient to said first oxide layer is inhibited by said second oxide layer, and the active ingredient is prevented from migrating to the support substrate by the first oxide layer.

2. A catalyst for purifying exhaust gases according to claim 1, wherein said active ingredient is alkali metal.

3. A catalyst for purifying exhaust gases according to claim 2, wherein said first oxide which has the first reactability with said active ingredient is an oxide of at least one metal selected from the group consisting of Si, P, W, and Ti.

4. A catalyst for purifying exhaust gases according to claim 2, wherein said second oxide which has the second reactability with said active ingredient is an oxide of at least one metal selected from the group consisting of Al, Zr, Ce and Y.

5. A catalyst for purifying exhaust gases according to claim 1, wherein neither said first oxide layer nor said second oxide layer includes a noble metal.

6. A catalyst for purifying exhaust gases comprising:
   a support substrate;
   a first oxide layer formed on a surface of the support substrate, the first oxide layer comprising a first oxide which has a first reactability with an active ingredient having reactability at least with the support substrate;
   a second oxide layer formed on a surface of the first oxide layer, the second oxide layer comprising a second oxide which has a second reactability with the active ingredient lower than said first reactability, and
   a catalyst layer formed on a surface of said second oxide layer, the catalyst layer comprising a porous oxide, the porous oxide including the active ingredient, and a noble metal;
   wherein the thickness of the first oxide layer is in the range from 5 μm to 40 μm.

7. A catalyst for purifying exhaust gases comprising:
   a support substrate;
   a first oxide layer formed on a surface of the support substrate, the first oxide layer comprising a firsts oxide which has a first reactability with an active ingredient having reactability at least with the support substrate;
   a second oxide layer formed on a surface of the first oxide layer, the second oxide layer comprising a second oxide which has a second reactability with the active ingredient lower than the first reactability, and
   a catalyst layer formed on a surface of the second oxide layer, the catalyst layer comprising a porous oxide, the porous oxide including the active ingredient, and a noble metal;
   wherein a thickness of the second oxide layer is in the range from 5 μm to 40 μm.

8. A catalyst for purifying exhaust gases comprising:
   a support substrate;
   a first oxide layer formed on a surface of the support substrate, the first oxide layer comprising a first oxide which has a first reactability with an active ingredient having reactability at least with the support substrate;
   a second oxide layer formed on a surface of the first oxide layer, the second oxide layer comprising a second oxide which has a second reactability with the active ingredient lower than the first reactability, and
   a catalyst layer formed on a surface of the second oxide layer, the catalyst layer comprising a porous oxide, the porous oxide including the active ingredient, and a noble metal;
   wherein the total thickness of the first oxide layer and the second oxide layer is 100 μm or less.

* * * * *

UNITED STATES PATENT AND TRADEMARK OFFICE
CERTIFICATE OF CORRECTION

| | |
|---|---|
| PATENT NO. | : 7,056,859 B2 |
| APPLICATION NO. | : 10/389919 |
| DATED | : June 6, 2006 |
| INVENTOR(S) | : Hachisuka |

It is certified that error appears in the above-identified patent and that said Letters Patent is hereby corrected as shown below:

Claim 1, col. 9, line 39, "ingredient said" should read --ingredient, said--.

Claim 7, col. 10, line 26, "firsts" should read --first--.

Signed and Sealed this

Second Day of January, 2007

JON W. DUDAS
*Director of the United States Patent and Trademark Office*